United States Patent
Tien

(10) Patent No.: US 10,890,944 B1
(45) Date of Patent: Jan. 12, 2021

(54) TABLET SUPPORT STAND

(71) Applicant: Ming-Tsong George Tien, Cupertino, CA (US)

(72) Inventor: Ming-Tsong George Tien, Cupertino, CA (US)

( * ) Notice: Subject to any disclaimer, the term of this patent is extended or adjusted under 35 U.S.C. 154(b) by 0 days.

(21) Appl. No.: 16/805,984

(22) Filed: Mar. 2, 2020

(51) Int. Cl.
*G06F 1/16* (2006.01)

(52) U.S. Cl.
CPC .......... *G06F 1/1632* (2013.01); *G06F 1/1626* (2013.01); *G06F 1/1662* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,426,868 | B1* | 7/2002 | Fullerton | G06F 1/1632 361/679.08 |
| 6,561,708 | B2* | 5/2003 | Lin | G06F 1/1632 248/900 |
| 6,585,162 | B2* | 7/2003 | Sandbach | G06F 1/1632 235/462.44 |
| 6,594,142 | B2* | 7/2003 | Katz | G06F 1/1626 341/22 |
| 6,714,404 | B1* | 3/2004 | Wu | G06F 1/1632 248/917 |
| 6,785,126 | B2* | 8/2004 | Hazzard | G06F 1/1632 361/679.09 |
| 6,798,649 | B1* | 9/2004 | Olodort | G06F 1/1618 235/61 R |
| 6,999,008 | B2* | 2/2006 | Wang | G06F 1/1632 341/22 |
| 7,102,614 | B2* | 9/2006 | Sandbach | G06F 1/1632 345/156 |
| 7,450,031 | B2* | 11/2008 | Wang | G06F 1/1632 341/22 |
| 7,479,902 | B2* | 1/2009 | Wang | G06F 1/1632 341/22 |
| 7,884,803 | B2* | 2/2011 | Huang | G06F 3/0221 345/169 |
| 8,956,061 | B2* | 2/2015 | Starrett | G06F 3/0231 400/472 |
| 8,995,149 | B2* | 3/2015 | Chen | G06F 1/1632 361/809 |
| 9,041,656 | B2* | 5/2015 | Lin | G06F 1/1626 345/168 |
| 9,378,702 | B2* | 6/2016 | Chen | G09G 5/003 |
| 9,601,079 | B2* | 3/2017 | Chen | G06F 1/1607 |
| 10,001,242 | B2* | 6/2018 | van Hooft | F16M 11/38 |
| 10,705,574 | B2* | 7/2020 | Robinson | G06F 1/1632 |
| 10,760,728 | B1* | 9/2020 | Maalouf | F16M 11/105 |
| 2002/0191999 | A1* | 12/2002 | Katz | H04M 1/23 400/472 |

(Continued)

*Primary Examiner* — Lisa Lea-Edmonds

(57) ABSTRACT

A tablet support stand attached a hinged left keyboard and right keyboard. When the keyboard folds, the two sides can capture the folded support stand creating a compact assembly that can be easily transported by the user and then unfolded when needed. The support arm is made of segments that are pivotally and frictionallly hinged. The support stand members are hollow and open on one side that allows the support arms to fold into each other for maximum compactness. A steel plate attached the back of a standard tablet attaches to a magnetic plate at the end of the support stand.

1 Claim, 15 Drawing Sheets

(56) References Cited

U.S. PATENT DOCUMENTS

| | | | |
|---|---|---|---|
| 2004/0001047 A1* | 1/2004 | Wang | G06F 1/1632 345/168 |
| 2004/0075588 A1* | 4/2004 | Wang | H01H 13/86 341/22 |
| 2004/0104897 A1* | 6/2004 | Mochizuki | G06F 3/0221 345/168 |
| 2004/0195305 A1* | 10/2004 | Dotson | G06F 1/1632 235/145 R |
| 2005/0002158 A1* | 1/2005 | Olodort | G06F 1/1671 361/679.15 |
| 2005/0104855 A1* | 5/2005 | Grossmeyer | G06F 3/0221 345/169 |
| 2006/0071820 A1* | 4/2006 | Wang | G06F 3/0202 341/22 |
| 2006/0165463 A1* | 7/2006 | Katz | H01H 13/86 400/472 |
| 2008/0174559 A1* | 7/2008 | Huang | G06F 1/1632 345/169 |

* cited by examiner

TABLET SUPPORT STAND

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of tablet support stands and more specifically to a foldable tablet and keyboard support stand.

Tablets are small computers that include a viewing touch screen. In some cases, a user attaches a keyboard either wirelessly or by wire to the tablet in order to more easily type documents while using the tablet. In this case, it would be helpful for the user to have the tablet set at an angle for easy viewing while also typing on the keyboard that is sitting on a table top or another horizontal surface. Ideally, the tablet is also raised up so that it can be seen without needing to bend one's neck downward, thereby reducing neck fatigue. It would be helpful if a table support stand could provide that feature and also be foldable so that it can be easily transported by the user. It also would be helpful if the keyboard and support stand were designed as one integral unit so that the can both be stored and then deployed when needed.

Tablet support devices are known, such as the Rolodex Document and Tablet holder ROLFG available through Amazon.com. Folding Bluetooth keyboards are also known, such as the Samsers Folding keyboard, available through Amazon.com. Adjustable height tablet holders are also known, such as the Lazyarm Tablet Holder available through Amazon.com.

However, none of the available devices combine the features of an adjustable height tablet holder and a folding keyboard into one compact device that can be easily carried by the user and set up quickly at any location. Additionally, none of the available devices includes a folding keyboard that can also be separated so that the left and right keyboards can be angled away from each other for idea ergonomic placement.

BRIEF SUMMARY OF THE INVENTION

The primary object of the invention is to provide a tablet support stand that is adjustable in angle and height.

Another object of the invention is to provide a tablet support stand that includes a folding keyboard.

Another object of the invention is to provide a tablet support stand that folds compactly so that the folded support arm is stored within the wings of the folded keyboard.

A further object of the invention is to provide a tablet support stand whose folding keyboard wings can be spread apart creating an ergonomically superior angle for use.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a tablet support stand comprising: a left keyboard, a right keyboard, a left keyboard hinge, a right keyboard hinge, a keyboard hinge, an adjustable support arm, a support arm base plate, a magnetic tablet holding plate, a steel tablet plate, said adjustable support arm including a first member, a second member, a third member and a fourth member, said first, second, third and fourth adjustable support members attached to each other via frictional post and hole rotatable joints, said first support member attached via a post and hole rotatable joint to said support arm base plate, said fourth adjustable support member terminating at its distal end in said tablet holding magnetic plate, said steel tablet plate fixedly and centrally attached to the back side of a standard tablet, said tablet holding magnetic plate removably attachable to said steel tablet plate, said right and left keyboards attached via said right and left keyboard hinges right and left side hinge plates, said hinge plates terminating in sockets, each capable of receiving a post, said support arm base plate including left and right sockets located at the far end of said base plate, each socket capable of receiving said post enabling said right and left hinge plates to be spread at an angle from said left and right keyboards, said first and second adjustable support members having a hollow construction and being open on one side allowing said second support arm to fold into said first support arm and said third support arm to fold into said second support arm, and said support arms capable of folding and nesting between said right and left keyboards when said keyboards are folded in the storage position.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE DRAWINGS AND PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
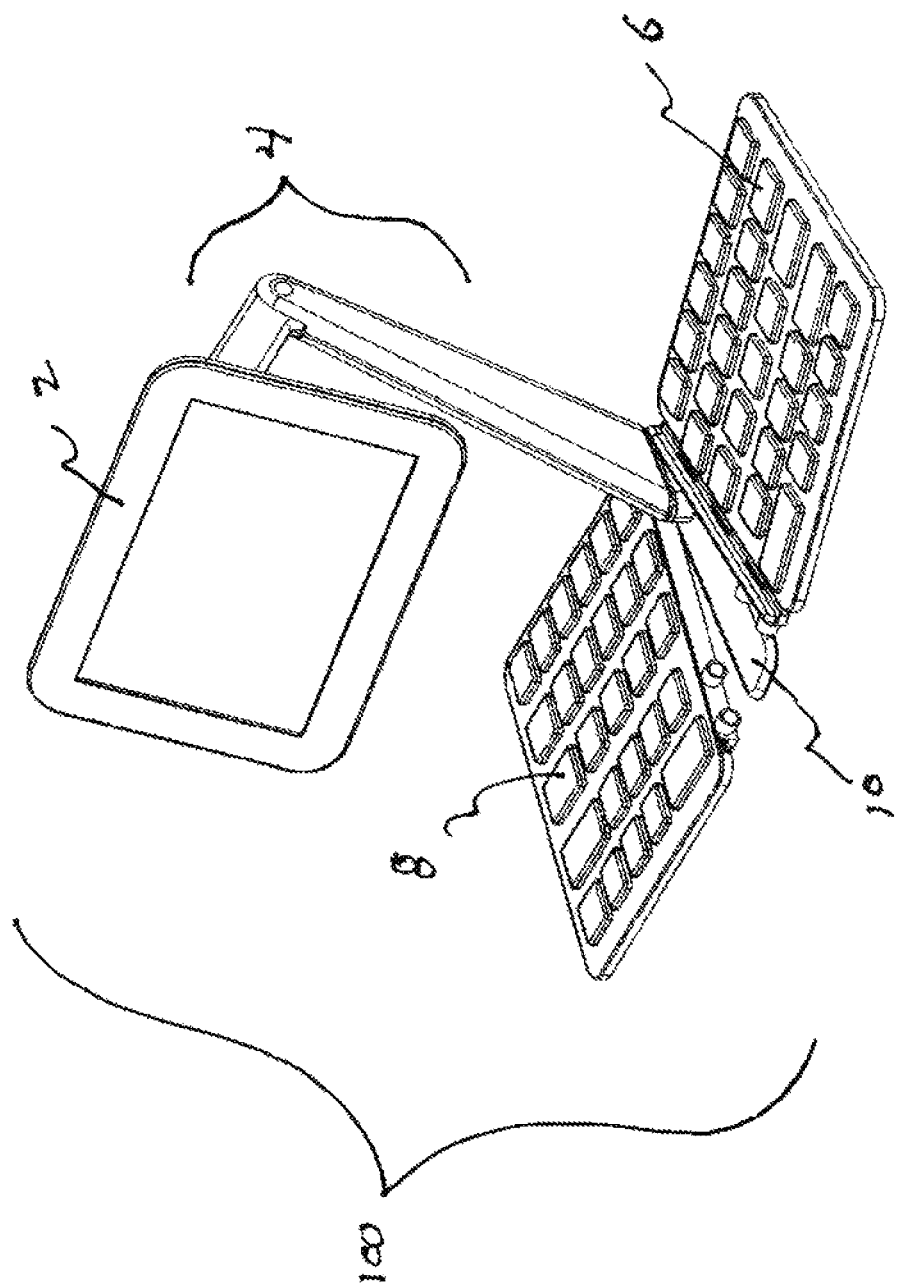
FIG. 1 is a front perspective view of the invention in the use position.

Referring now to FIG. 1 we see a front perspective view of the invention 100 in the use position. A tablet 2 is supported on an adjustable support arm assembly 4. The support arm 4 is plugged into a base plate 10. A left 8 and right 6 Bluetooth keyboard is attached to the base plate enabling a user to type on the keyboard 6, 8 while viewing the table 2 at a comfortable eye level, without the need to look down thereby reducing neck strain. The ability of the keyboards 6, 8 to be angled outward away from the base plate 10 creates a more ergonomic position for placement of the user's hands during typing activity.

Figure 2:
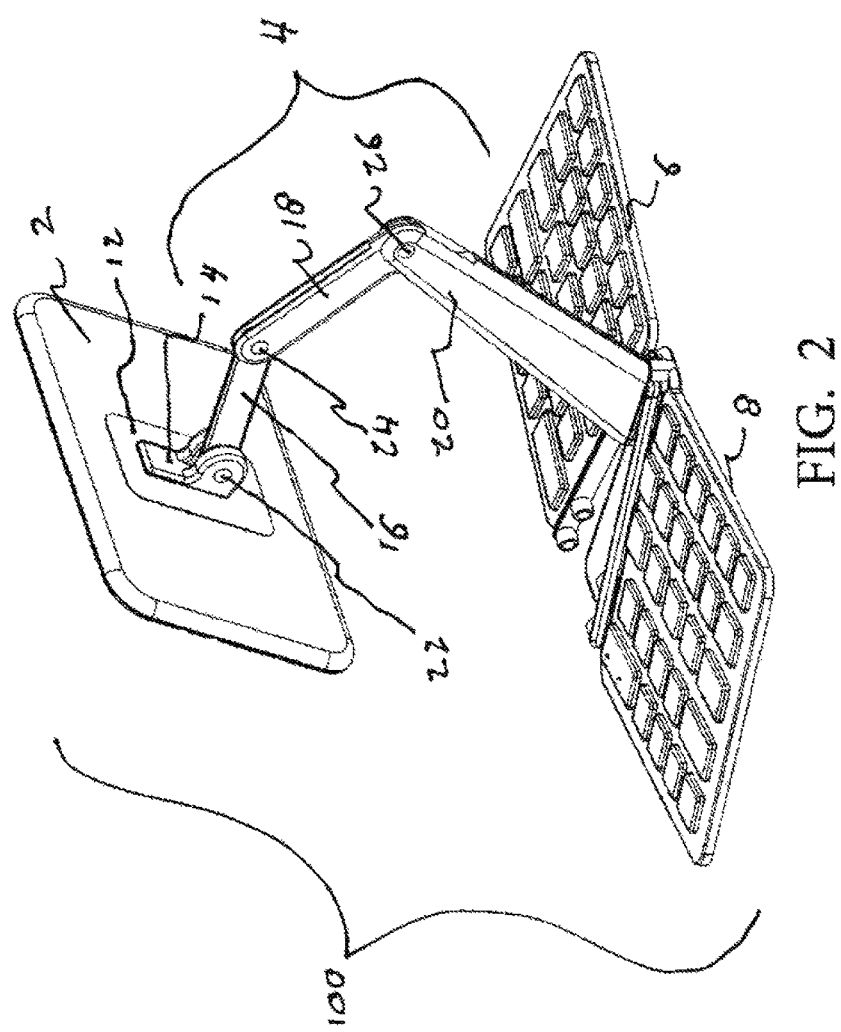
FIG. 2 is a rear perspective view of the invention in the use position.

FIG. 2 is a perspective view of the rear of the invention 100. The support arm assembly 4 is made up of a first arm 20, a second arm 18, a third arm 16 and a fourth arm 14. Each arm is rotatably and frictionally held by hinge pins 26, 24, and 22. The tablet 2 is held to the fourth arm 14 via a magnet that is contained within the arm panel 14. The magnet arm panel 14 is attracted to a steel plate 12 which is fixedly and centrally attached to the rear of the tablet 2.

Figure 3:
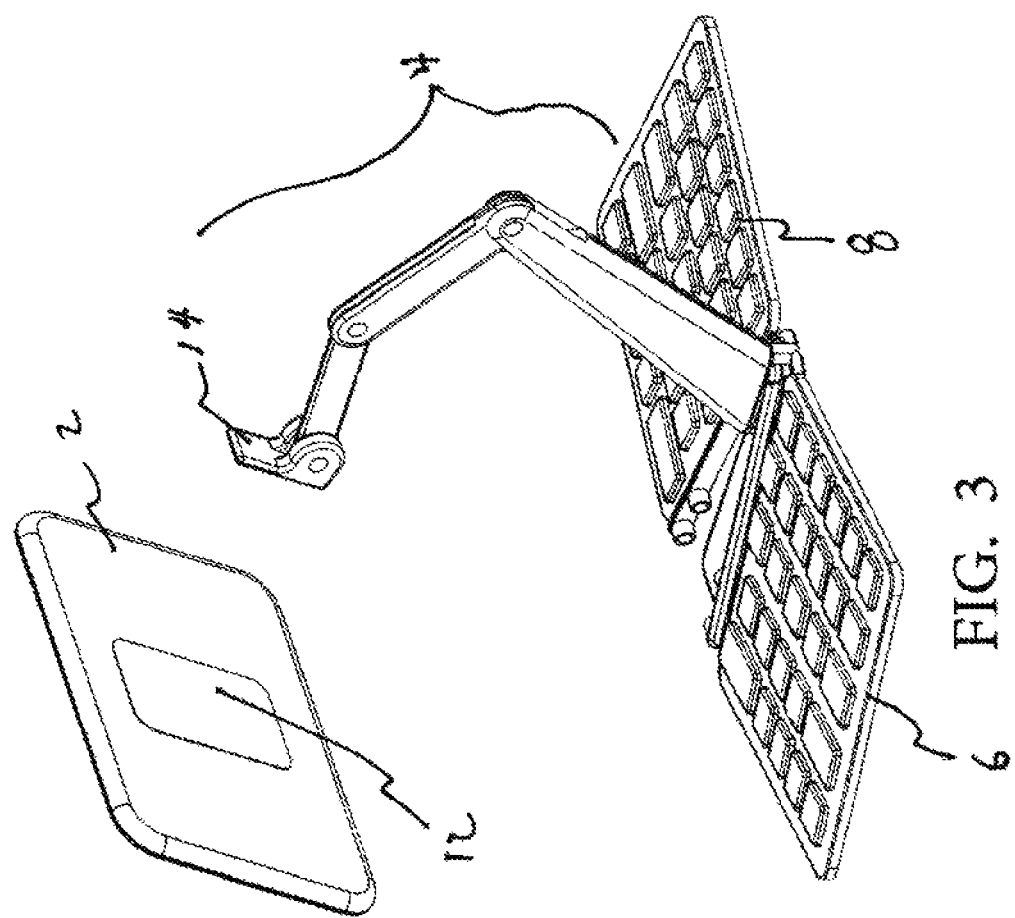
FIG. 3 is a rear perspective view with the tablet removed.
Figure 11:
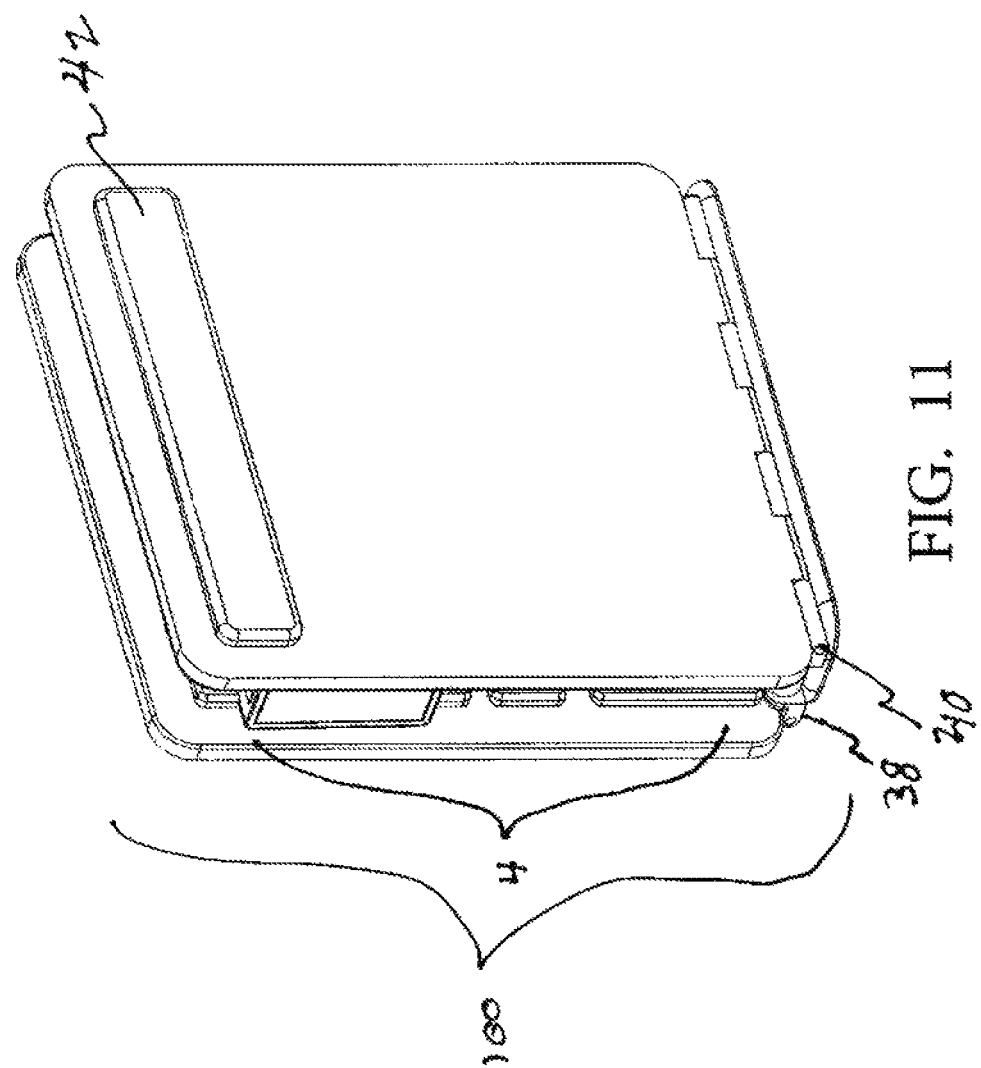
FIG. 11 is a perspective view with the left and right keyboard folded for storage.

FIG. 3 is a rear perspective view of the invention showing tablet 2 and steel plate 12 removed from magnetic arm 14. The arm assembly 4 and keyboard 6, 8 are now free to be folded by the user into a compact storage mode as shown in FIG. 11.

Figure 4:
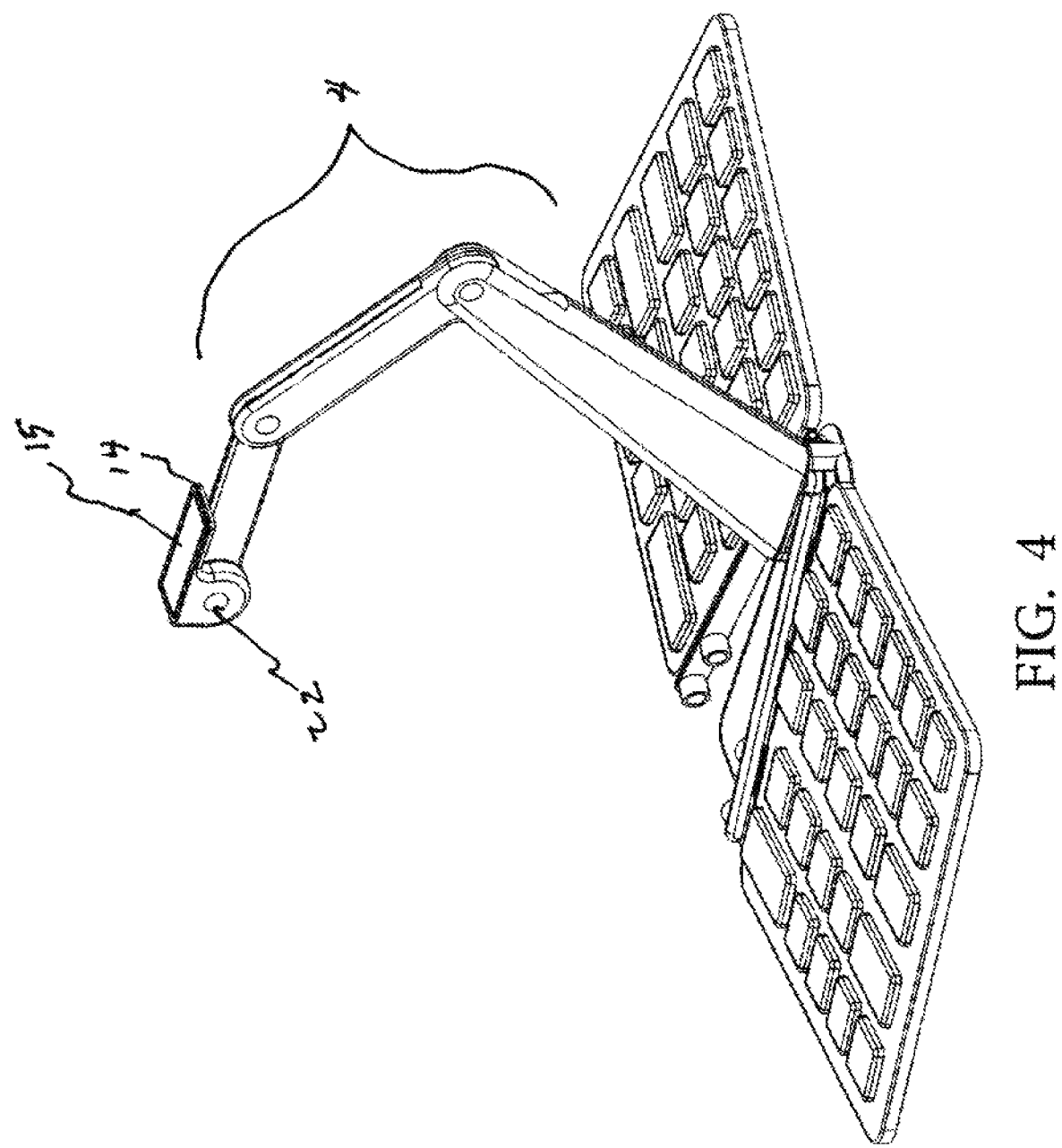
FIG. 4 is a rear perspective view with the fourth arm folded for storage.

FIG. 4 is a rear perspective view of the invention with the fourth arm 14 folded revealing magnetic plate 15.

Figure 5:
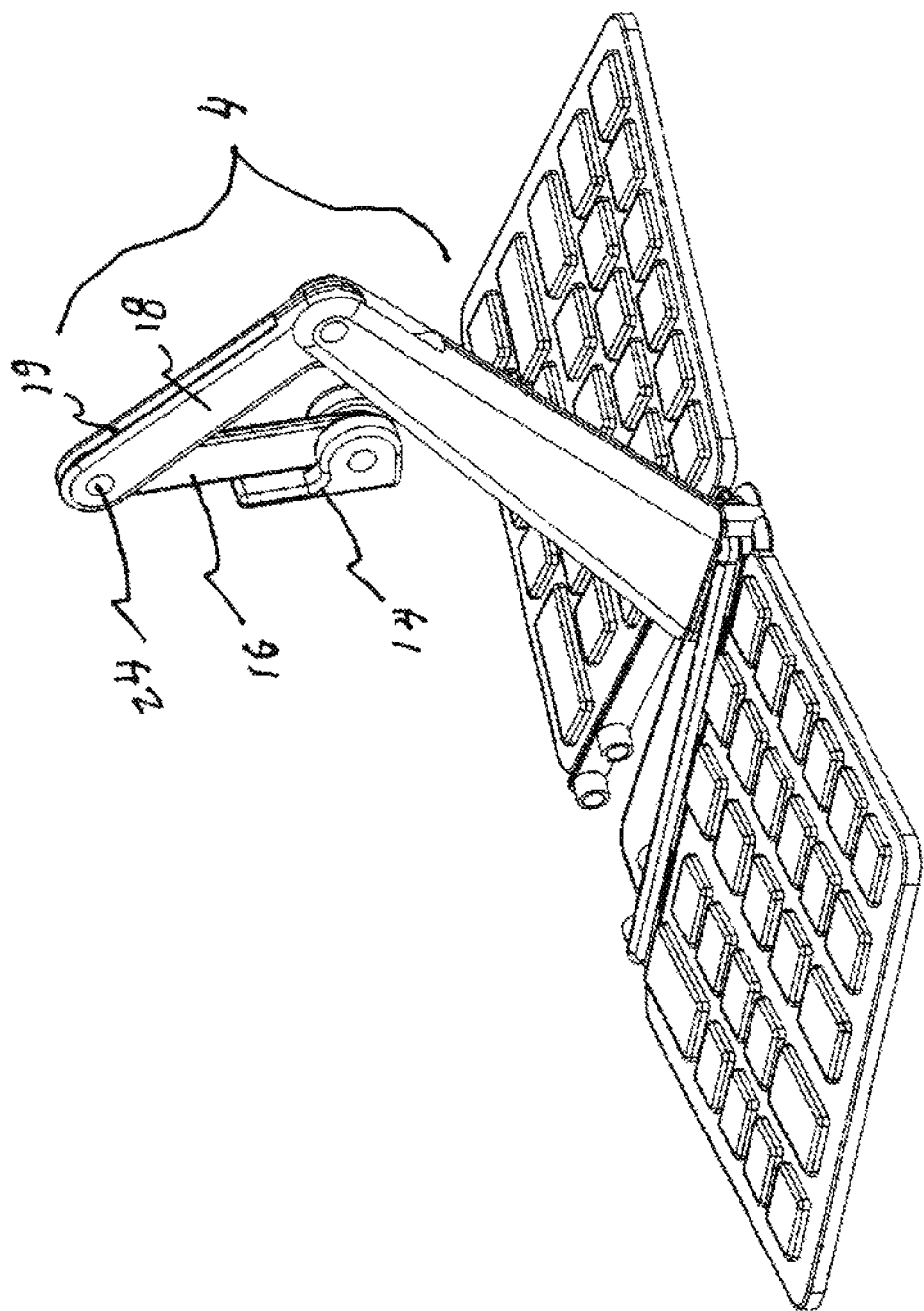
FIG. 5 is a rear perspective view with the third arm folded for storage.

FIG. 5 is a rear perspective view of the invention with the third arm 16 folded for storage. The third arm 16 can fold completely into second arm 18 due to the cutout slot area 19 of second arm 18.

Figure 6:
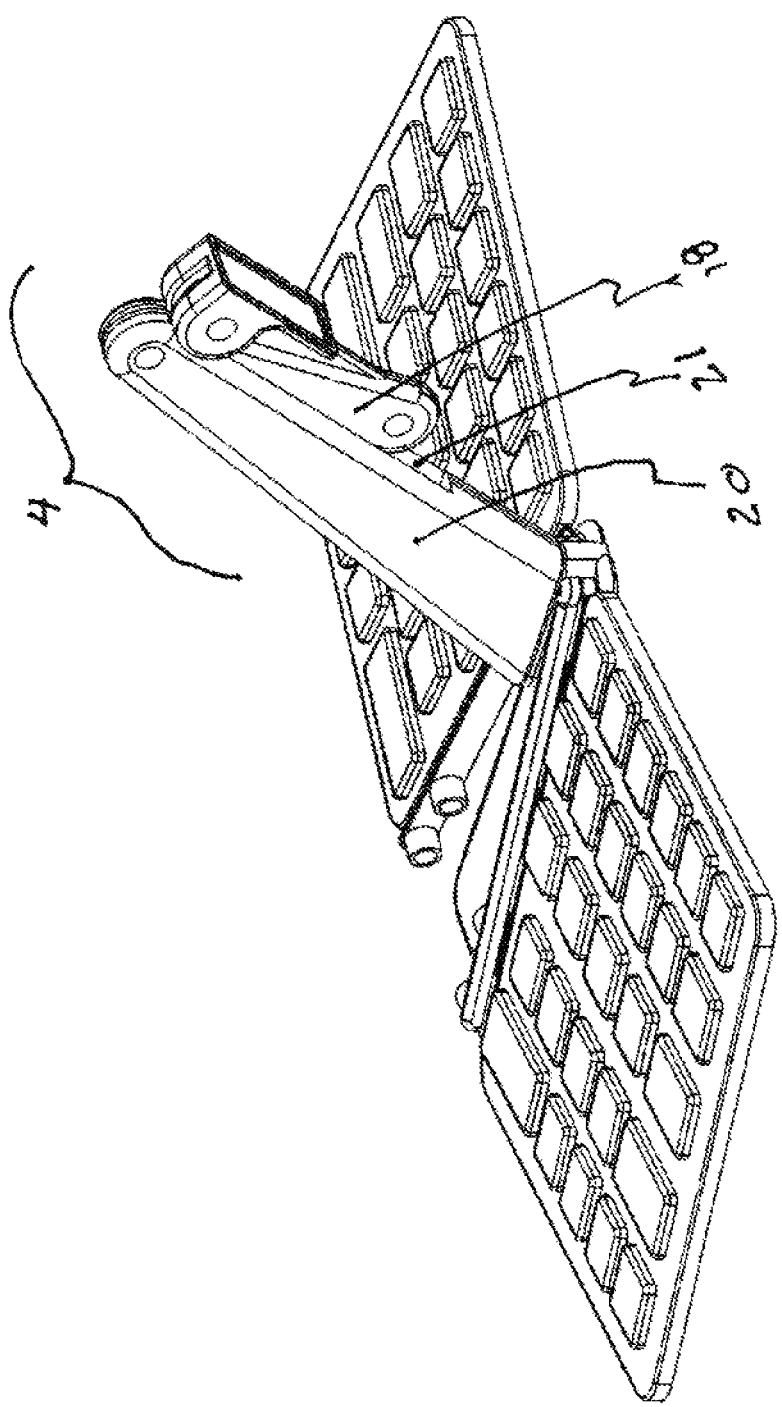
FIG. 6 is a rear perspective view with the second arm folded for storage.

FIG. 6 is a rear perspective view of the invention with the second arm 18 folded into the first arm 20. First arm 20 also includes a slot 21 to allow the second arm 18 to more fully fold. The entire folding assembly is reminiscent of the art of Japanese Origami folded paper designs.

Figure 7:
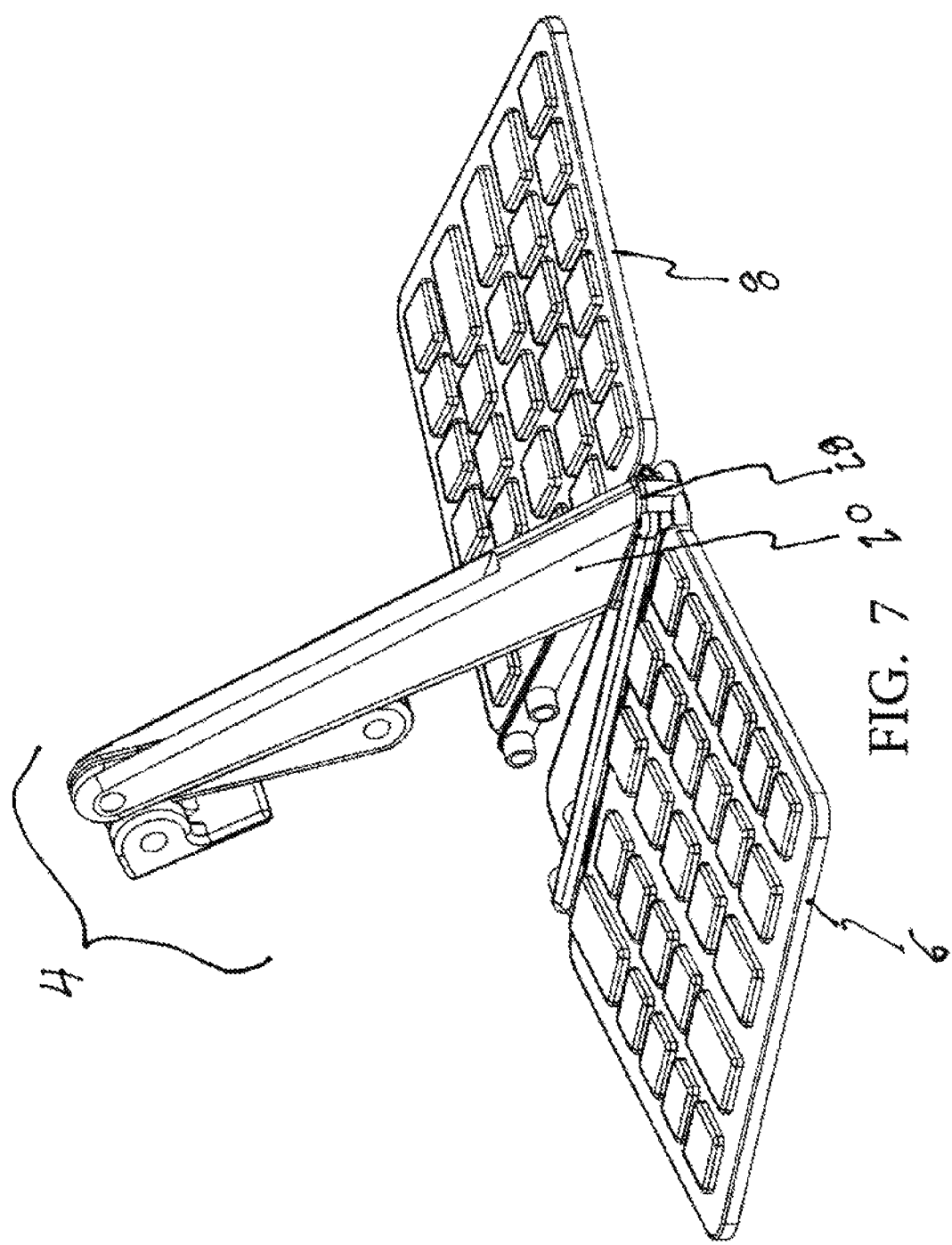
FIG. 7 is a rear perspective view with the second arm swiveled for storage.

FIG. 7 is a rear perspective view of the invention with the first arm 20 and attached arm assembly 4 swiveled one hundred and eighty degrees to allow the arm assembly 4 to fit within the confines of keyboards 6, 8 when they are folded up for storage.

Figure 8:
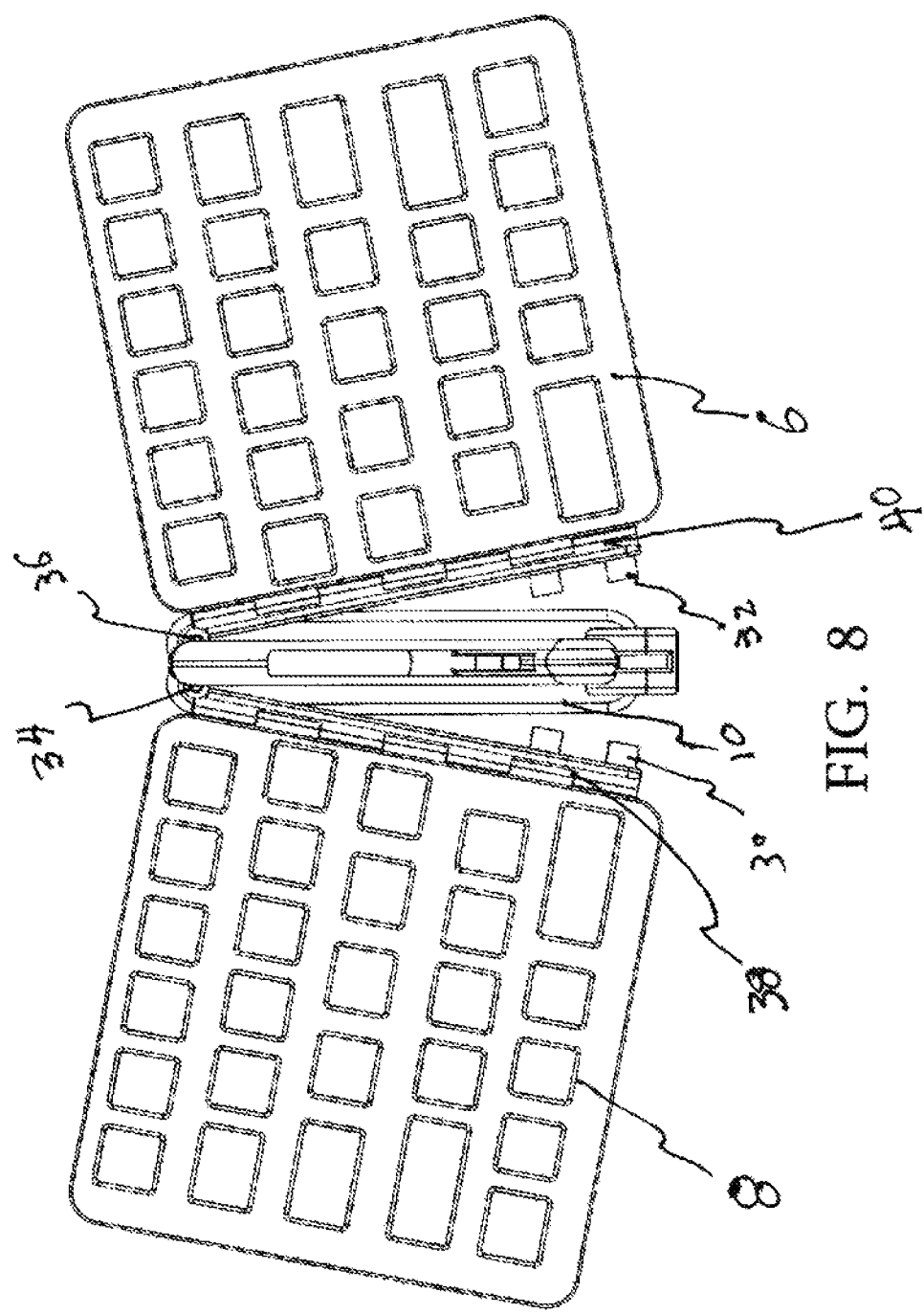
FIG. 8 is a top view of the arm assembly folded for storage.

FIG. 8 is a top plan view of the invention. Keyboards 6, 8 are pinned to the base plate by hinge pins 34, 36. The keyboards 6, 8 can be swung in so that magnetic members 30, 32 are attracted to each other to hold the keyboards together before folding up for storage.

Figure 9:
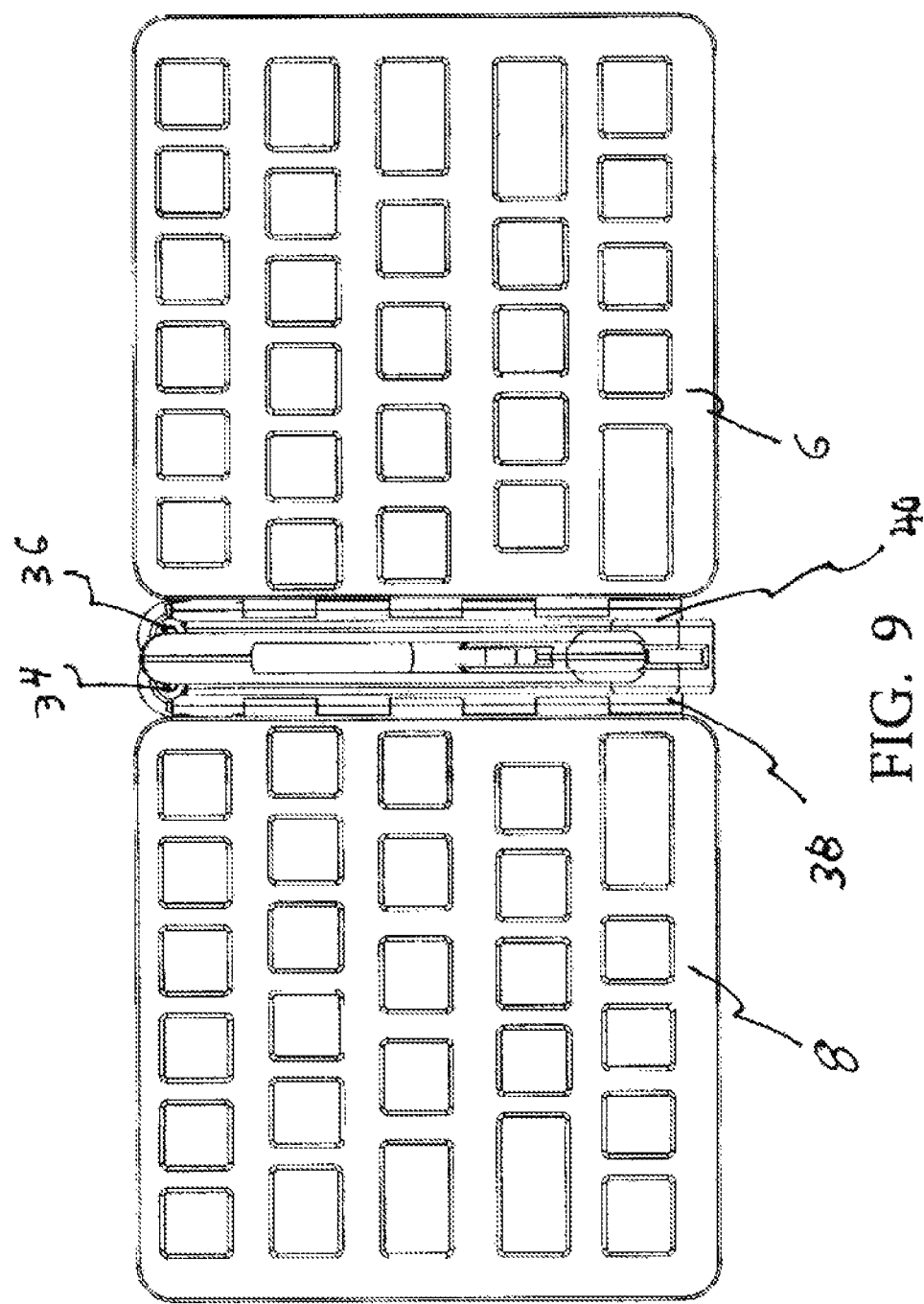
FIG. 9 is a top view with the keyboard halves swung in for storage.
Figure 10:
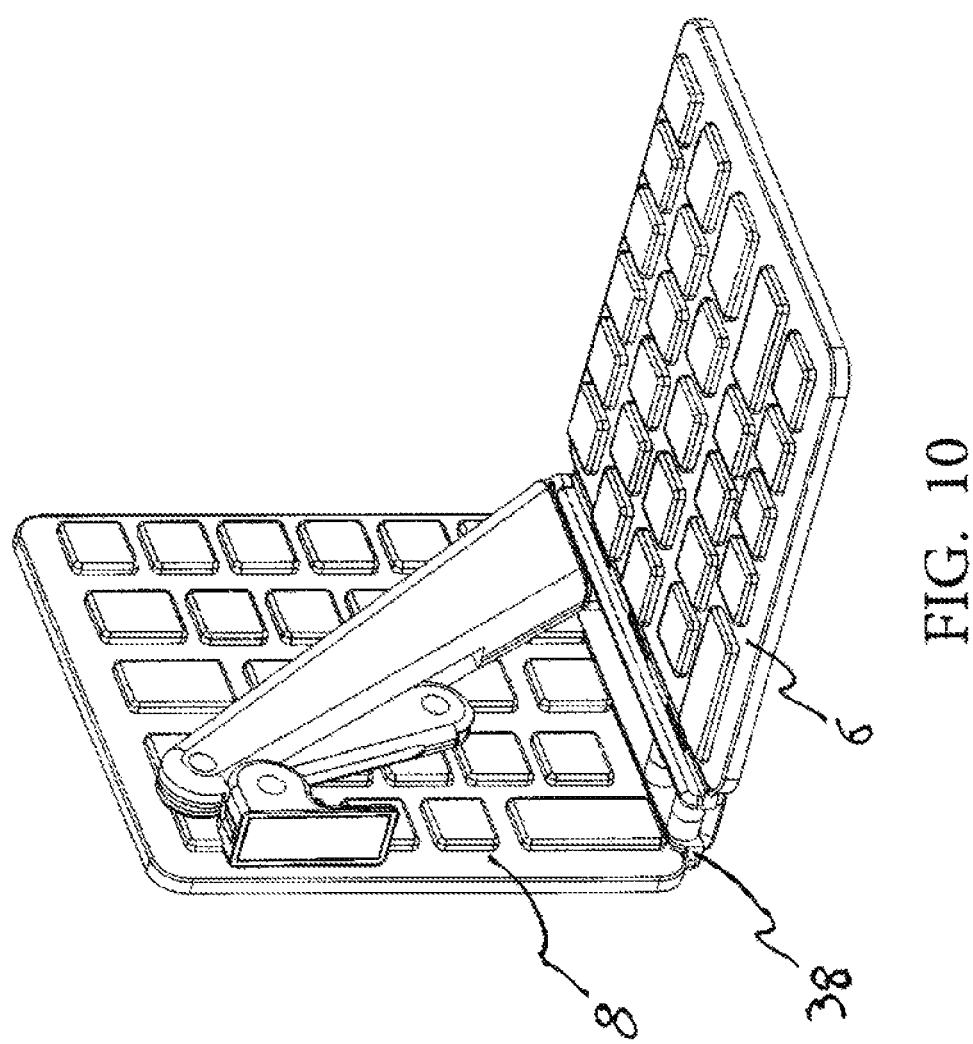
FIG. 10 is a perspective view with the left keyboard folded for storage.

FIG. 9 is a top plan view showing the two keyboards 6, 8 swung toward each other and magnetic members 30, 32 are mated. Hinge plate members 38 and 40 allow the keyboards 6, 8 to fold up for storage FIG. 10 is a perspective view showing keyboard 8 folded up via hinge plate member 38.

FIG. 11 is a perspective view showing keyboards 6, 8 completely folded via hinge plate members 38, 40. Rubber bumper 42 helps prevent sliding when the keyboards 6, 8 are folded down in the use position. Notice that support arm 4 is completely retained within the space between the two keyboards 6, 8.

Figure 12:
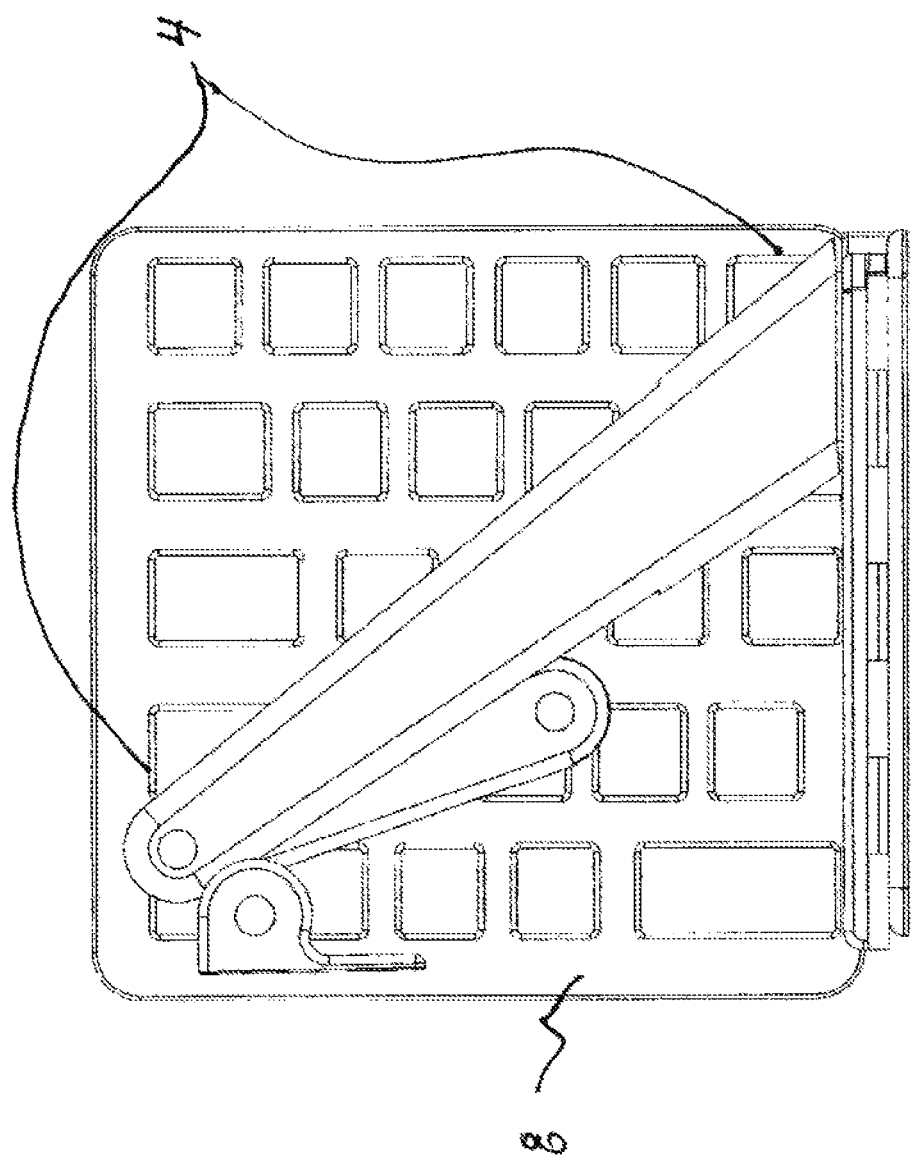
FIG. 12 is a side view of the folded unit with the right keyboard removed.

FIG. 12 is a side view with keyboard 6 removed to show how support arm assembly 4 is completely retained within the space between the two keyboards 6, 8.

Figure 13:
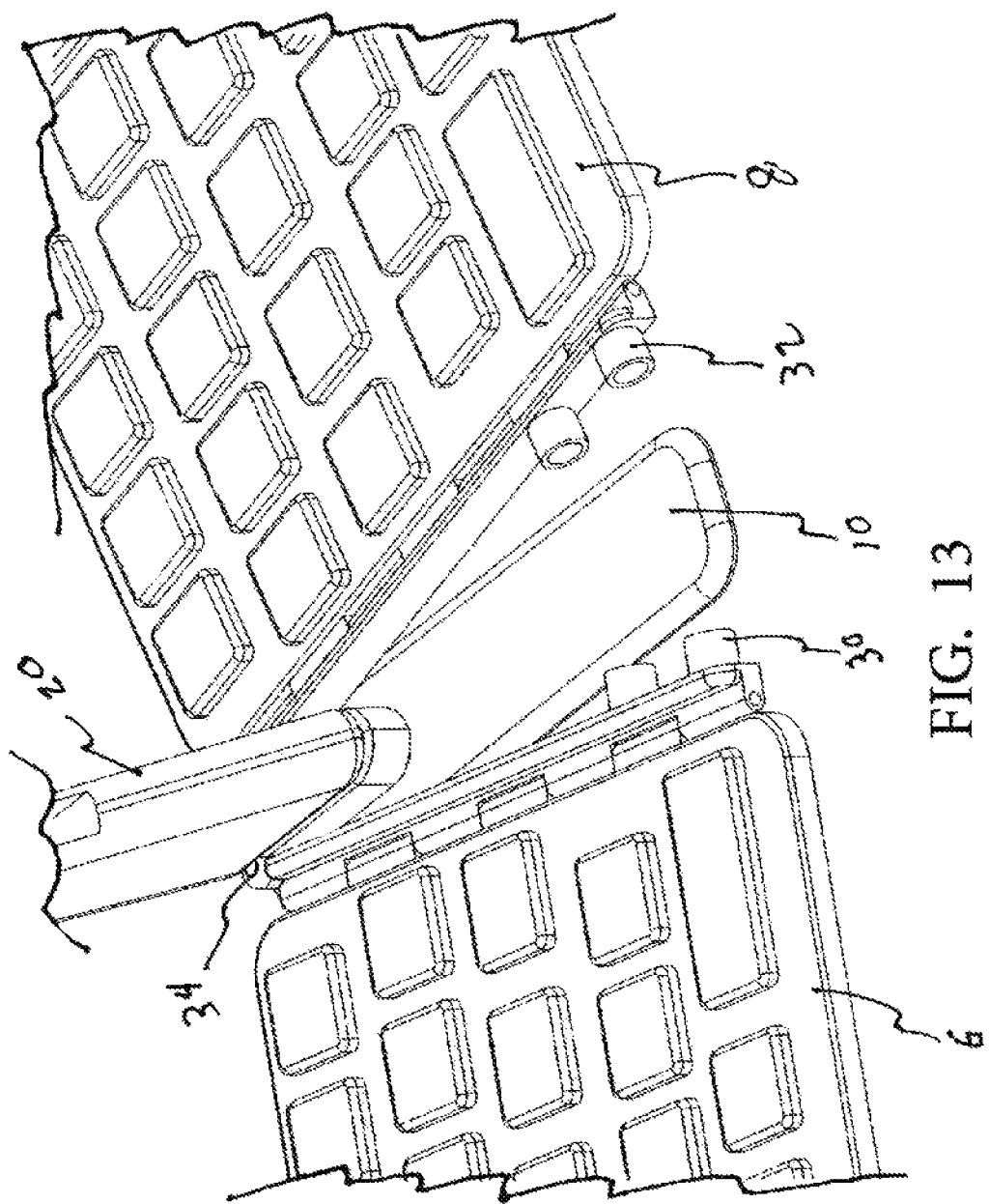
FIG. 13 is a partial perspective view showing the magnetic connectors for holding the keyboard halves together.

FIG. 13 is a partial perspective view showing magnetic members 30, 32 ready to engage each other when the two keyboards 6, 8 are swung closed via hinge pins 34, 36.

Figure 14:
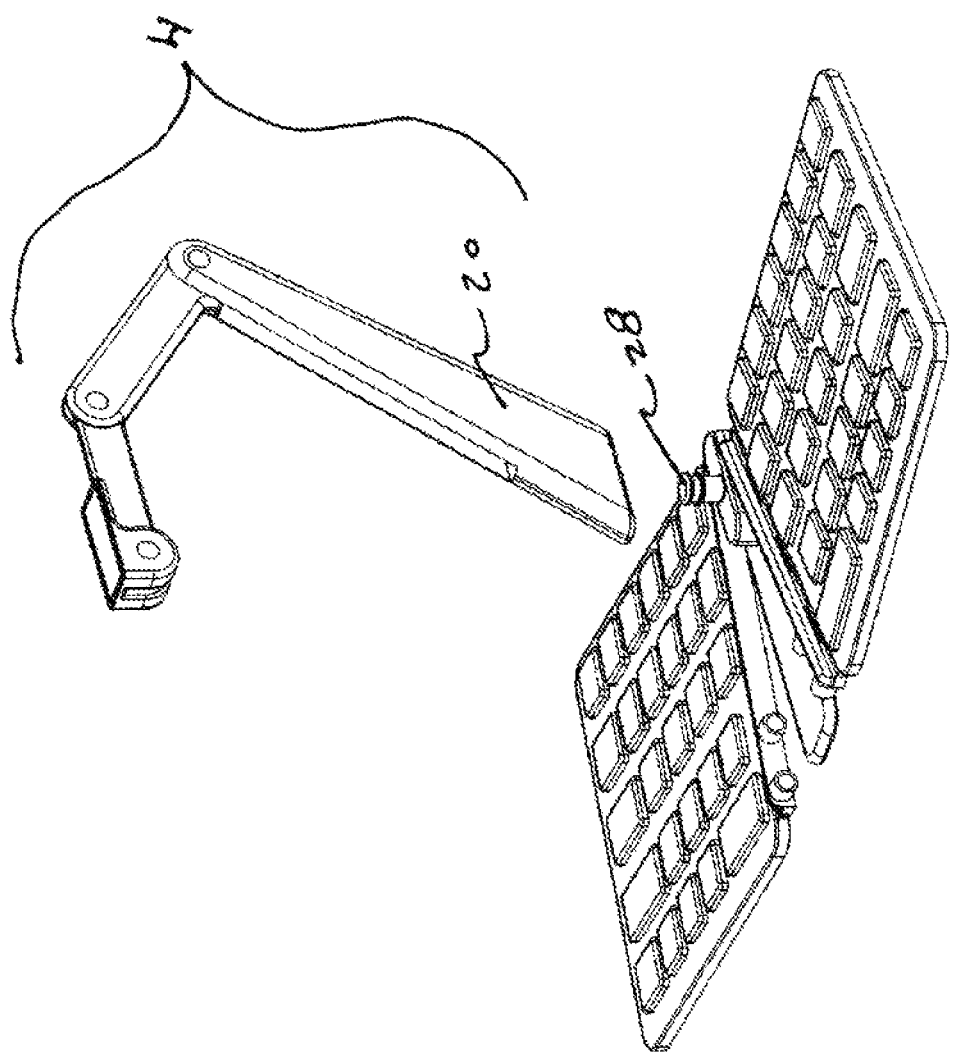
FIG. 14 is a perspective view showing the arm assembly removed from the base plate.

FIG. 14 is an exploded view showing first arm 20 removed from a pivot post 28. The pivot post 28 allows the arm 20 to swivel one hundred and eighty degrees for storage purposes.

Figure 15:
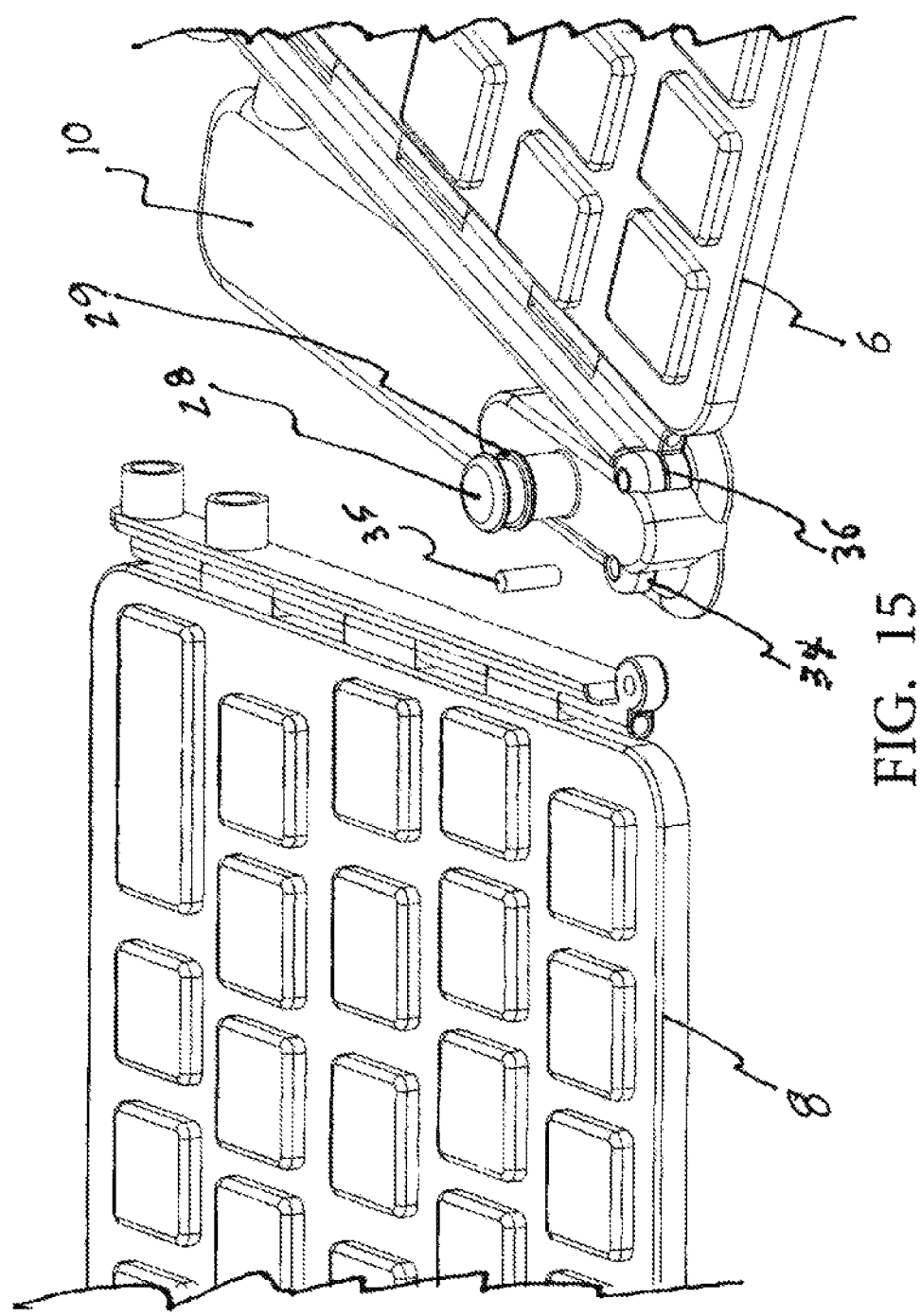
FIG. 15 is a partial perspective view showing the hinge pins for the left and right keyboard attachment method.

FIG. 15 is a close-up view of keyboard hinge pin assemblies 34, 36 with hinge pin 35 removed and keyboard 8 slid away from the remainder of the invention. 0 ring 29 provides friction so that when first arm 20 swings, it remains in place until the user decides to swivel the arm 20 for storage purposes.

The entire invention is light weight and folds, Origami-Like when in its compact stored position. The ability of the tablet holding arm assembly 4 to be adjusted by the user means that the user will have a more comfortable experience when typing and simultaneously viewing the screen of the tablet. The ability for the keyboard to be slid apart at the front while being pinned at the rear creates a resulting arrangement that makes it ergonomically more comfortable for the user to type.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Tablet support stand comprising:
   a left keyboard;
   a right keyboard;
   a left keyboard hinge plate;
   a right keyboard hinge plate;
   an adjustable support arm;
   a support arm base plate;
   a magnetic tablet holding plate;
   a steel tablet plate;
   said adjustable support arm including a first member, a second member, a third member and a fourth member;
   said first, second, third and fourth adjustable support members attached to each other via frictional post and hole rotatable joints;
   said first support member attached via a post rotatable joint to said support arm base plate;
   said fourth adjustable support member terminating at its distal end in said tablet holding magnetic plate;
   said steel tablet plate fixedly and centrally attached to the back side of a standard tablet;
   said tablet holding magnetic plate removably attachable to said steel tablet plate;
   said right and left keyboards attached via said right and left keyboard hinges right and left side hinge plates;
   said hinge plates terminating in sockets, each capable of receiving a post;
   said support arm base plate including left and right sockets located at the far end of said base plate, each socket capable of receiving said post enabling said right and left hinge plates to be spread at an angle from said left and right keyboards;

said first and second adjustable support members having a hollow construction and being open on one side allowing said second support arm to fold into said first support arm and said third support arm to fold into said second support arm; and said support arms capable of folding and nesting between said right and left keyboards when said keyboards are folded in the storage position.

* * * * *